United States Patent [19]

Sharpe

[11] 4,055,354
[45] Oct. 25, 1977

[54] HIKERS CART

[76] Inventor: Donald M. Sharpe, 18962 Chadbourne Lane, Santa Ana, Calif. 92706

[21] Appl. No.: 711,659

[22] Filed: Aug. 4, 1976

[51] Int. Cl.² .............................................. B62B 1/20
[52] U.S. Cl. ............................ 280/47.31; 280/47.32; 280/78
[58] Field of Search ............... 280/47.32, 78, 47.3, 280/47.31

[56] References Cited

U.S. PATENT DOCUMENTS

| 2,979,338 | 4/1961 | Dwyer | 280/43.3 |
| 2,992,834 | 7/1961 | Tidwell | 280/47.3 |
| 3,662,803 | 5/1972 | Kuvik | 280/47.35 |
| 3,722,904 | 3/1973 | Puckett | 280/47.31 |

Primary Examiner—Robert R. Song
Attorney, Agent, or Firm—Knobbe, Martens

[57] ABSTRACT

A cart for two hikers to transport a load includes a single wheel with an elongate frame disposed directly over the wheel. Braces supporting the frame on the wheel extend closely adjacent the wheel to minimize the width. Handlebars at opposite ends permit the hikers to direct and propel the cart. A pair of containers are hooked over the frame on opposite sides of the wheel for carrying the load.

13 Claims, 5 Drawing Figures

HIKERS CART

BACKGROUND OF THE INVENTION

With the increased popularity of camping in remote areas, there is a need for a satisfactory substitute for hikers to carry materials into a remote area other than on their back. In the prior art, carts have been designed for carrying game or injured people out of remote areas, but such carts have been of designs not satisfactory for use by hikers as a substitute for back packing.

U.S. Pat. No. 3,820,807 shows a prior art cart specifically designed for carrying supplies into a remote camp, but the cart disclosed in that patent is not satisfactory for a number of reasons. The load in that patent is disposed directly over the wheel, requiring that the wheel be of small diameter in order to keep the overall height of the device reasonable. Such smaller diameter wheels have difficulty traversing rough terrain as they tend to be more susceptible to get stuck in ruts. In addition, that patented device places the center of gravity of the load relatively high because the load is disposed over the wheel, thereby decreasing stability of the device. In addition, the load carrying portions of that device is not readily removable from the frame, nor can the frame be readily disassembled for transportation in an automobile in a compact fashion when traveling to the starting point of the hike. These and other disadvantages are overcome by the cart of this invention.

SUMMARY OF THE INVENTION

In accordance with this invention, a single wheel has a singular elongated top frame disposed directly over the wheel and extending forward and rearward from the wheel. Supporting braces extend down from the top frame alongside the wheel closely adjacent to the wheel to minimize the width of the device. A pair of U-shaped handlebars are mounted at opposite ends of the elongate frame so that two persons can direct and propel the wheel with its load-supporting frame. A pair of containers, which in the exemplary embodiment are open mesh baskets, are hooked over the frame on opposite sides of the wheel for retaining the load. With this arrangement the load is balanced and the containers extend down alongside of the wheel so as to lower the center of gravity.

Moreover, in accordance with one aspect of this invention the baskets are loosely suspended from the frame by hook-shaped hangers which hook over the frame, and the sides of the baskets bear against the sides of the wheel mounting frame members. This also minimizes the overall width of the device, which preferably is arranged such that the hand grips are no further apart than the baskets carrying the load, but neither do the baskets extend any substantial distance beyond the hand grips so as to provide an overall narrow cart for easy traverse through narrow obstructed pathways.

Since the baskets in accordance with one aspect of this invention are merely suspended from the frame, they can be removed for loading and for use at the campsite. In addition, a pair of table top members are adapted to fit in the respective containers and to lay side by side on top of the containers when the containers are stood upright on the ground to serve as a table at the campsite.

In addition, the frame members are interconnected by wing nuts or other readily removable fasteners so that the entire device can be disassembled to a very compact shape without the use of any tools since such tools might not normally be available to the hiker.

These and other advantages and features of this invention will be apparent for the following detailed description of the preferred embodiment.

DESCRIPTION OF THE DRAWING VIEWS

DESCRIPTION OF A PREFERRED EMBODIMENT

Figure 1:
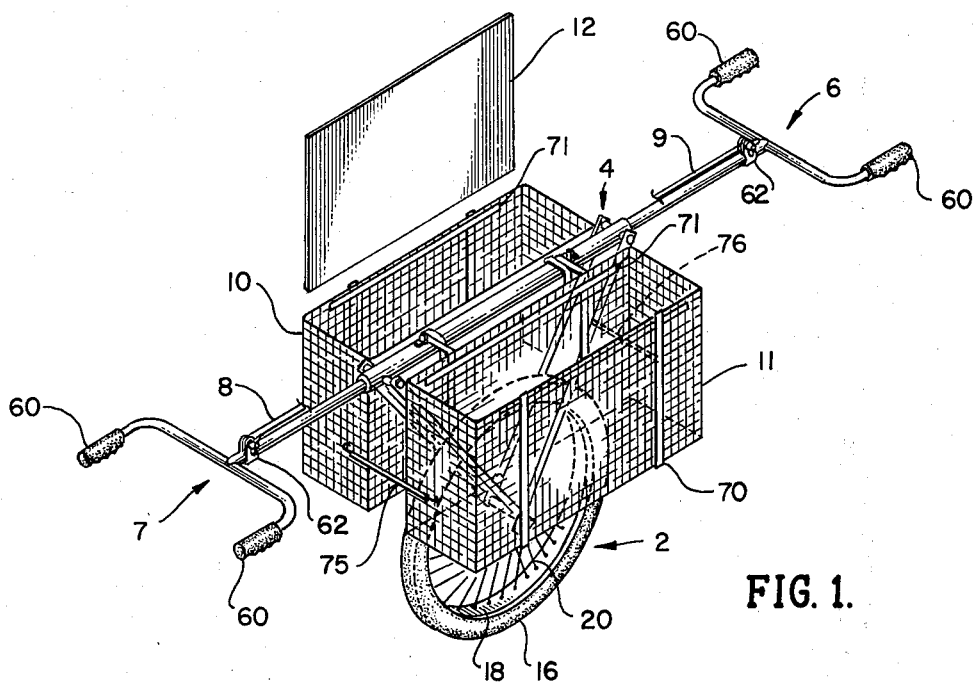
FIG. 1 is a perspective view of the cart fully assembled and ready for operation, with portions of the cart stands removed for clarity, and with one of the table top members shown in an exploded position above the device.

Referring to FIG. 1, the cart comprises a single wheel 2, a frame assembly 4 mounted on the single wheel, a pair of handlebar assemblies 6 and 7 mounted at opposite ends of the frame 4, a pair of stands 8, 9 mounted on the handlebar assemblies 6 and 7, a pair of baskets 10, 11 suspended from the frame 4, and a pair of table top members 12, 13, only one of which is shown in FIG. 1.

Figure 4:
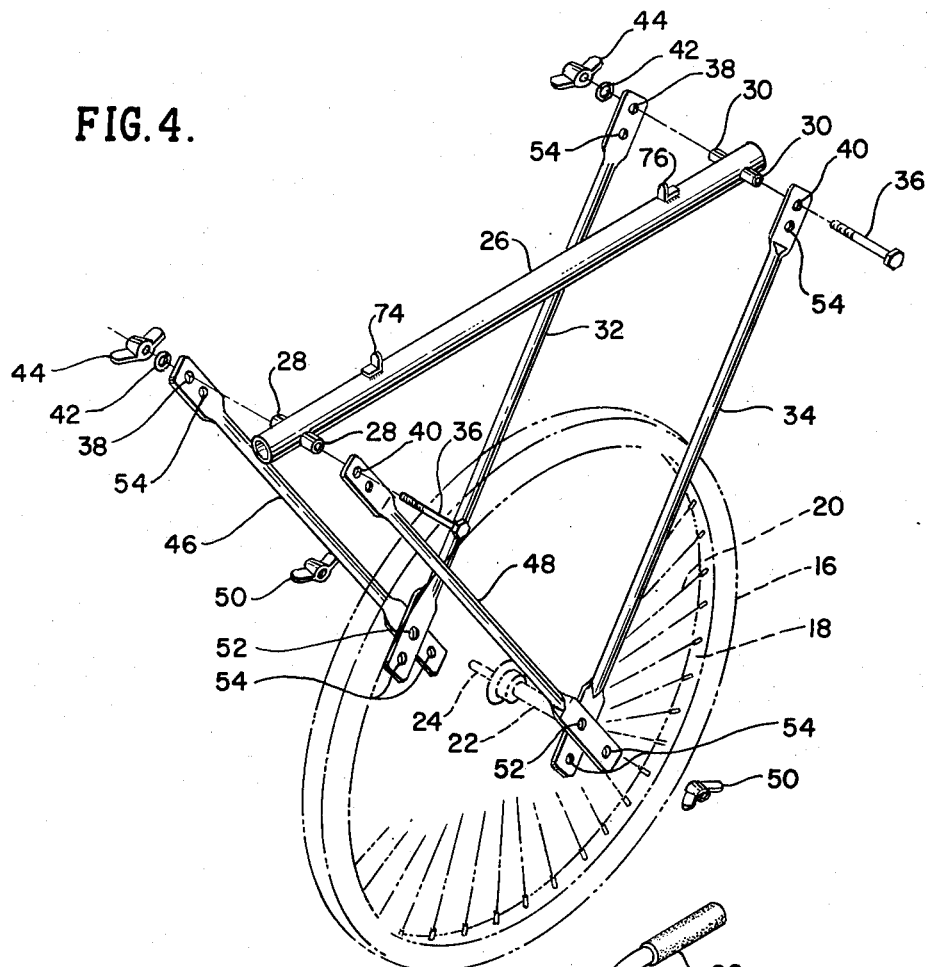
FIG. 4 is an exploded perspective view of a portion of the device.

Referring now to FIG. 1 and 4, the wheel 2 may be a pneumatic standard bicycle tire 16, which has a rim 18 and spokes 20 extending out from a hub 22 through which an axle 24 extends about which the wheel rotates. The frame assembly 4 includes an elongate top frame member 26 which in the preferred embodiment is a hollow tubular member of lightweight steel or aluminum. The top frame member 26 has welded at its opposite ends four laterally extending collars arranged in axially aligned pairs 28, 30. A pair of forwardly extending support braces 32, 34 extend from opposite sides of the axle 24 upward and forward to the forward pair of collars 30, where they are connected to the top frame member 26 by a bolt 36 which extends through apertures 38, 40 at the upper ends of each forward support member and through the collars 30. In completing the assembly, a lock washer 42 and wing nut 44 are connected on the bolt 36.

Similarly, a pair of rearwardly extending support braces 46, 48 are also mounted on opposite sides of the axle 24 and are connected in the same manner to the collars 28 at the rear end of the top frame member 26. Wing nuts 50 are also used to attach the support members 32, 34, 46, 48 to the opposite ends of the axle 24 extending through aligned holes 52 located at the lower ends of the support members 32, 34, 46, 48. One or more additional holes 54 may be provided at both ends of each support braces in order to adjust the height of the top frame member 26 and the extending handle assemblies 6 and 7 above the wheel for the comfort of the hikers navigating the pack carrier.

Figure 2:
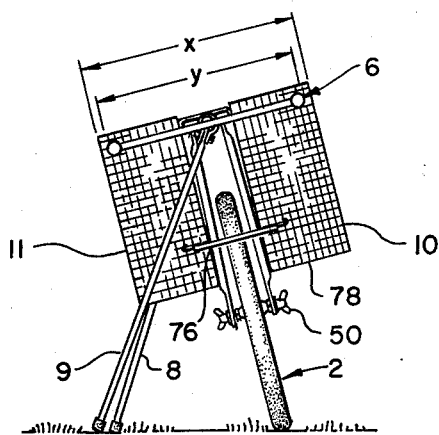
FIG. 2 is an end elevational view showing the cart with the stands lowered to support the cart.
Figure 5:
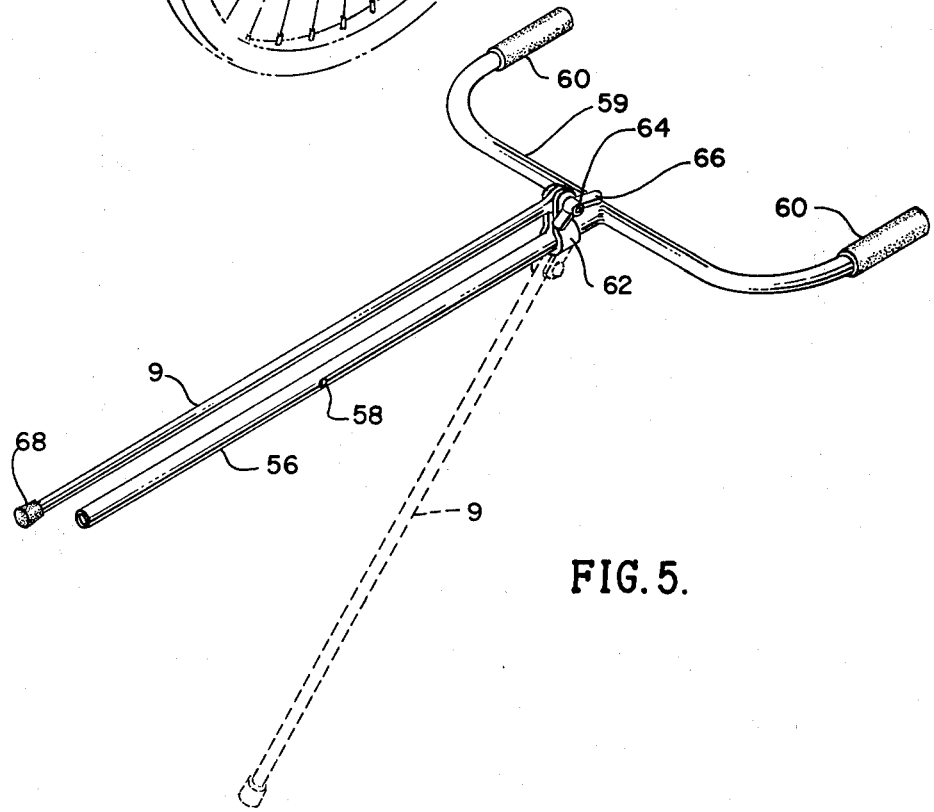
FIG. 5 is a perspective view of one of the handlebar assemblies with its associated stand.

Referring now to FIG. 1 and 5, each of the handlebar assemblies 6 and 7 includes an elongate tubular member 56 which telescopes into one end of the top frame member 26. A lateral aperture 58 through the tubular member 56 is in parallel alignment with the bores through the collars 30 so that the bolts 36 also extend through the tubular member 56 to connect the handle assemblies 6, 7 to the frame with the same fastener connecting the wheel support members together. At the outer end of the tubular member 56, a U-shaped tubular member 59 forming a handlebar is welded or otherwise affixed thereto, and has typical bicycle hand grips 60 mounted on the ends for ease in handling. A pivotal stand is also attached to each handlebar assembly and comprises an elongate tubular member 8, 9 connected to the tubular member 56 near its outer end by a clamp 62 surrounding the tubular member 56. A bolt 64 and wing nut 66 extends through the clamp 62 and the stand member to make the connection. In FIG. 5, the stand member 9 is shown in solid lines its normal inoperative position, and in dotted lines in its lowered position wherein it functions as a stand to support the cart. Movement from one position to the other is achieved by loosening the wing nut 66 so as to permit pivoting of the stand about the axis of the bolt 64 and, by rotating the clamp 62 on the tubular member 56, pivoting about the axis of the tubular member 56. The end of the stand 9 is fitted with a small rubber or plastic tip 68 providing friction on the ground. FIG. 2 shows the cart with the stand member 8, 9 down to support the cart in a generally upright position. Both handlebar assemblies and stand are the same.

Figure 3:
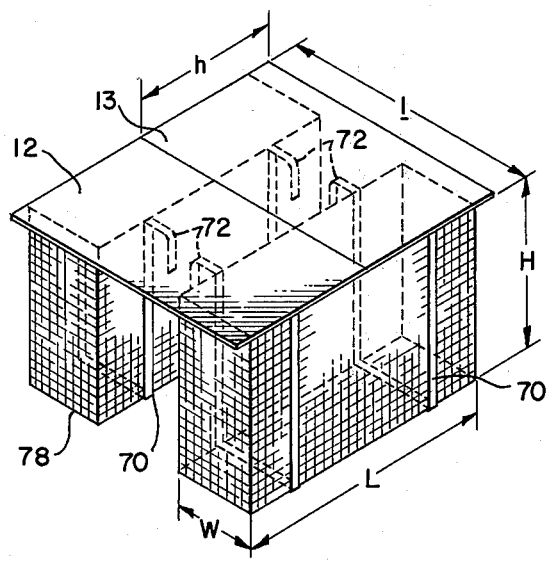
FIG. 3 is a perspective view showing the baskets removed from the cart and supporting the table top.

Referring now to FIGS. 1 and 3, each of the baskets 10, 11 is rectangular in configuration and preferably is made of an open mesh metal or plastic to reduce weight. Each of the baskets has a length L and a height H which is considerably greater than the width W so that a large amount of camping paraphernalia can be loaded without resulting in a wide cart which would be difficult to navigate through narrow trails. Each basket has mounted thereon, for example by welding, a pair of support hangers 70 each of which comprises an elongate flat bar extending up the inner sidewall of the basket and terminating in a hook-shaped portion 72 adapted to hook over the top frame member 26 to suspend the basket. The bar 70 also continues at its other end across the bottom of the basket and up the opposite side to strengthen the basket where it is riveted to inner reinforcement bars 71. Each basket is provided with two such hook members 72 for stability. It can be seen in FIGS. 1 and 4 that a pair of studs 74, 76 extend upwardly from the top frame member 26 to serve as longitudinal stops for the hooks 72 to prevent the baskets from sliding longitudinally along the top frame member.

As can be seen in FIG. 2, the support frame members 32, 34, 46, 48 are disposed very close to the wheel, and the baskets 10, 11 are held against those side support members 32, 34, 46, 48, by elastic straps 75, 76 connected across the front and back of the baskets. The straps 75, 76 having hooks at their ends engaged in the basket mesh and are readily removable. It is also apparent from FIG. 2 that the overall width X of the cart is about the same as the width Y of the handlebars, being slightly larger in the preferred embodiment. The width Y of the handlebars preferably is selected to be comfortable for a person pulling or pushing the cart, and also such that the cart can be picked up and carried in the hands at the shoulder level when obstacles such as logs across the path must be traversed or a stream must be forded.

Referring now to FIGS. 1 and 3, the bottom 78 of each of the baskets is flat so as to provide a stable base when the baskets are removed from the cart and stood upright on the ground. Two table top panels 12, 13 can be placed across the tops of the baskets to form a raised table top surface. For this reason, the hooks 72 preferably do not extend above the tops of the baskets as otherwise they would interfere with the table top panels 12, 13 resting on the baskets 10, 11. Each of the table tops is of a length $l$ slightly smaller than the inside length L of the basket so that it can slide down against the outer side of the basket to provide additional protection to the contents. The height $h$ of each table top member is slightly larger than half the length L of the containers so that when the table top members 12, 13 rest on the basket containers 10, 11 to form a table top they overhang the baskets only slightly at the forward and rearward end.

In operation, the cart can be transported in a vehicle from the home base in a disassembled state, as best shown in FIGS. 4 and 5, with the handlebar assemblies 6, 7 separated from the frame member 26, and the four support members 32, 24, 46, 48 disassembled from each other and from the wheel 2. One of the baskets is preferably made slightly smaller than the other so that it can be nested in the other for compactness. When it is desired to assemble the cart for use, the frame members 26, 32, 34, 46, 48 are assembled to each other and to the wheel 2 and to the handlebar assemblies 6 using the bolts and four wing nuts as described above, and not requiring the use of any special tools. The baskets 10, 11 are then hung on the frame, and if the table tops 12, 13 are to be used they are placed in the baskets. Two persons then stand at opposite ends of the cart and grip the handle grips 60, both persons facing in the same direction. It is then very comfortable for them to walk along with the handlebar grips preferably at about waist level and the entire load supported on the wheel. As noted above, adjustments can be made in the height of the frame and therefore of the hand grips, and persons of differing height can be readily accomodated simply by tilting the frame so that its forward or rearward end is higher than the opposite end. As noted above, if a stream must be forded, the cart with the load can be lifted and carried.

It has been found that this device provides a practical and highly satisfactory cart for carrying loads into remote and otherwise inaccessible areas with a minimum of effort on the part of the hikers. The two stands allow the hikers to park the vehicle in an upright position along the trail. The entire vehicle can be readily disassembled by merely removing the four wing nuts and the two upper bolts; and can be as readily re-assembled.

What is claimed is:

1. A device for transporting a load comprising:
a single wheel;
an elongated frame disposed directly over the wheel and extending forward and rearward of said wheel;
means extending down from said frame alongside said wheel mounting said frame on the wheel for travel therewith;
said mounting means extending no more than about several inches laterally of said wheel;
handle means at each end of the frame for use by two persons to direct and propel the wheel;
a pair of containers mounted on said frame and disposed on opposite sides of said wheel for retaining a load.

2. A device in accordance with claim 1 wherein said containers are suspended from said frame and bear laterally against said mounting means.

3. A device in accordance with claim 2 wherein each of said containers includes a pair of hook-shaped hangers which hook over the frame to suspend the containers therefrom.

4. A device in accordance with claim 1 wherein said containers are removable from said frame by lifting said containers without unfastening any fasteners.

5. A device in accordance with claim 1 wherein said containers are open mesh baskets.

6. A device in accordance with claim 5 wherein one basket is slightly narrower and shorter than the other for nesting one inside the other when said device is disassembled.

7. A device in accordance with claim 1 wherein said containers each extend down at least to about the axle of the wheel.

8. A device in accordance with claim 1 wherein said pair of handles each comprises a U-shaped member having a pair of grips spaced equally on opposite sides of said wheel a distance approximately equal to the distance outward from said wheel to the outside of said baskets.

9. A device in accordance with claim 1 wherein said means extending down from said frame comprise two pairs of elongated members on opposite sides of said wheel, each pair having two diagonal members to form a triangular support with said frame.

10. A device in accordance with claim 1 and further comprising a pair of stands each mounted on said frame between said wheel and a respective handle, each said stand being pivotable from a first position extending down to the ground at an angle to the wheel, to a second position off the ground and extending parallel along said frame.

11. A device for transporting a load on irregular terrain comprising:
   a bicycle-type wheel having a pneumatic tire and spoked wheel member;
   a first diagonal frame member extending forward and upward from the axle of said wheel to a height above said wheel;
   a second diagonal frame member extending rearward and upward from the axle of said wheel to a height above said wheel;
   an elongate third frame member extending between the top portions of the first and second frame members;
   a pair of handlebar assemblies each connected at an opposite end of said third frame member for two persons at opposite ends to propel and direct the wheel;
   a pair of load retaining containers disposed on opposite sides of said wheel and suspended from said third frame member;
   means removably connecting said first and second frame members to said axle and to said third frame member, said means being adapted for ready removal without the use of a tool.

12. A device in accordance with claim 11 and further wherein said means for connecting said handlebar assemblies to said frame member is adapted for ready removal without the use of a tool; and only four nuts connect the three frame members and the handlebar assemblies and wheel.

13. A combination load carrying device and table for hikers comprising:
   a wheel;
   an elongate frame connected to said wheel, said frame being disposed directly over said wheel and extending forward and rearward thereof;
   a pair of load carrying containers supported from said frame on opposite sides of said wheel, each container having a length and height which are considerably greater than its lateral width;
   each container being readily removable from the frame and having a flat bottom for resting upright on the ground when removed from the frame;
   a pair of table top sheets each of a height and length slightly smaller than a respective container for fitting into said container against a side thereof;
   said table tops and said containers being constructed and adapted so that said tops extend side by side across the two containers standing upright on the ground for serving as a table with the containers as the pedestals.

* * * * *

UNITED STATES PATENT OFFICE
CERTIFICATE OF CORRECTION

Patent No. 4,055,354   Dated Oct. 25, 1977

Inventor(s) Donald M. Sharpe

It is certified that error appears in the above-identified patent and that said Letters Patent are hereby corrected as shown below:

Column 5, line 36, change "member" to -- members --.

Signed and Sealed this

Fourteenth Day of March 1978

[SEAL]

Attest:

RUTH C. MASON
Attesting Officer

LUTRELLE F. PARKER
Acting Commissioner of Patents and Trademarks